United States Patent
Bhanu et al.

(10) Patent No.: US 9,466,000 B2
(45) Date of Patent: Oct. 11, 2016

(54) DYNAMIC BAYESIAN NETWORKS FOR VEHICLE CLASSIFICATION IN VIDEO

(75) Inventors: Bir Bhanu, Riverside, CA (US); Mehran Kafai, Riverside, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 212 days.

(21) Appl. No.: 14/117,678

(22) PCT Filed: May 21, 2012

(86) PCT No.: PCT/US2012/038814
§ 371 (c)(1),
(2), (4) Date: Nov. 14, 2013

(87) PCT Pub. No.: WO2012/159109
PCT Pub. Date: Nov. 22, 2012

(65) Prior Publication Data
US 2014/0085475 A1    Mar. 27, 2014

Related U.S. Application Data

(60) Provisional application No. 61/487,944, filed on May 19, 2011.

(51) Int. Cl.
| | | |
|---|---|---|
| G06K 9/00 | (2006.01) | |
| G06K 9/46 | (2006.01) | |
| G06K 9/62 | (2006.01) | |

(52) U.S. Cl.
CPC ....... *G06K 9/00791* (2013.01); *G06K 9/00825* (2013.01); *G06K 9/46* (2013.01); *G06K 9/4652* (2013.01); *G06K 9/6267* (2013.01)

(58) Field of Classification Search
CPC ................................ H04N 5/235; H04N 5/33
See application file for complete search history.

(56) References Cited

U.S. PATENT DOCUMENTS
| | | |
|---|---|---|
| 7,466,860 B2 | 12/2008 | Chang et al. |
| 2006/0088207 A1 | 4/2006 | Schneiderman |
| 2006/0209072 A1 | 9/2006 | Jairam et al. |

OTHER PUBLICATIONS

Dlagnekov et al. "Recognizing cars," Dept. Comput. Sci. Eng., UCSD, San Diego, Tech. Rep. CS2005-083, 2005.*
Xu et al "Vehicle Detection using Bayesian Network Enhanced Cascades Classification (BNECC)", 978-1-4244-8126-2/10/$26.00 © 2010 IEEE.*
Cooper et al. "A Bayesian Method for the Induction of Probabilistic Networks from Data"; Machine Learning, 9, 309-347 (1992).*

(Continued)

*Primary Examiner* — Jay Patel
*Assistant Examiner* — Frank Huang
(74) *Attorney, Agent, or Firm* — Buchanan Ingersoll & Ingersoll, PC

(57) ABSTRACT

A system and method for classification of passenger vehicles and measuring their properties, and more particularly to a stochastic multi-class vehicle classification system, which classifies a vehicle (given its direct rear-side view) into one of four classes Sedan, Pickup truck, SUV/Minivan, and unknown, and wherein a feature pool of tail light and vehicle dimensions is extracted which feeds a feature selection algorithm to define a low-dimensional feature vector, and the feature vector is then processed by a Hybrid Dynamic Bayesian Network (HDBN) to classify each vehicle.

32 Claims, 11 Drawing Sheets

(56) References Cited

OTHER PUBLICATIONS

Nadimi et al. "Multistrategy fusion using mixture model for moving object detection" in Proc. Int. Conf. Multisens. Fusion Integr. Intell. Syst., 2001, pp. 317-322.*
Loy et al, "Detecting symmetry and symmetric constellations of features," in Proc. Eur. Conf. Comput. Vis., 2006, pp. 508-521.*
Nadimi et al. "Physical models for moving shadow and object detection in video," IEEE Trans. Pattern Anal. Mach. Intell., vol. 26, No. 8, pp. 1079-1087, 2004.*
International Search Report (PCT/ISA/210) mailed on Dec. 28, 2012, by the Korean Patent Office as the International Searching Authority for International Application No. PCT/US2012/038814.
Written Opinion (PCT/ISA/237) mailed on Dec. 28, 2012, by the Korean Patent Office as the International Searching Authority for International Application No. PCT/US2012/038814.
Lim et al., "Car recognition using Gabor filter feature extraction," in Asia-Pacific Conference on Circuits and Systems. APCCAS '02, vol. 2, 2002, pp. 451-455.
Shan et al., "Unsupervised learning of discriminative edge measures for vehicle matching between nonoverlapping cameras," IEEE Transactions on Pattern Analysis and Machine Intelligence, vol. 30, No. 4, pp. 700-711, Apr. 2008.
Wei et al., "A method of vehicle classification using models and neural networks," in IEEE VTS 53rd Vehicular Technology Conference, VTC '01, vol. 4, 2001, pp. 3022-3026.
Ma et al., "Edge-based rich representation for vehicle classification," in Tenth IEEE International Conference on computer Vision, ICCV '05, vol. 2, Oct. 2005, pp. 1185-1192.
Jolly et al., "Vehicle segmentation and classification using deformable templates," IEEE Transactions on Pattern Analysis and Machine Intelligence, vol. 18, No. 3, pp. 293-308, Mar. 1996.
Khan et al., "3D model based vehicle classification in aerial imagery," in IEEE Conference on Computer Vision and Pattern Recognition, CVPR '10, Jun. 2010, pp. 1681-1687.
Prokaj et al., "3D model based vehicle recognition," in Workshop on Applications of Computer Vision, WACV '09, Dec. 2009, pp. 1-7.
Psyllos et al., "Vehicle model recognition from frontal view image measurements," Computer Standard Interfaces, vol. 33, pp. 142-151, Feb. 2011.
Čonos, "Recognition of vehicle make from a frontal view," Master's thesis, Czech Technical University, Prague, Czech Republic, 2006. (62 pages).
Dlagnekov, "Video-based car surveillance: License plate, make, and model recognition," Master's thesis, University of California, San Diego, 2005. (93 pages).
Loy et al., "Detecting symmetry and symmetric constellations of features," in ECCV, 2006, pp. 508-521.
Nadimi et al., "Physical models for moving shadow and object detection in video," IEEE Transactions on Pattern Analysis and Machine Intelligence, vol. 26, pp. 1079-1087, 2004.
Abolghasemi et al., "An edge-based color-aided method for license plate detection," Image and Vision Computing, vol. 27, pp. 1134-1142, Jul. 2009.
Paulo et al., "Automatic detection and classification of traffic signs," in Eighth International Workshop on Image Analysis for Multimedia Interactive Services, WIAMIS '07, Jun. 2007. (4 pages).
Guo et al., "Matching vehicles under large pose transformations using approximate 3D models and piecewise MRF model," IEEE Conference on Computer Vision and Pattern Recognition, CVPR '08, pp. 1-8,2008.
Otsu, "A threshold selection method from gray-level histograms," IEEE Transactions on Systems, Man and Cybernetics, vol. 9, No. 1, pp. 62-66, Jan. 1979.

* cited by examiner (a)

K2 generated structure (b)

Manually structured Bayesian network

DYNAMIC BAYESIAN NETWORKS FOR VEHICLE CLASSIFICATION IN VIDEO

CROSS REFERENCE TO RELATED APPLICATIONS

This application claims priority under 35 U.S.C. §119 to U.S. Provisional Application No. 61/487,944 entitled DYNAMIC BAYESIAN NETWORKS FOR VEHICLE CLASSIFICATION IN VIDEO, filed May 19, 2011, the entire content of which is hereby incorporated by reference.

GOVERNMENT INTEREST

This invention was made with Government support under Grant No. IIS0905671 awarded by National Science Foundation. The Government has certain rights in this invention.

FIELD OF THE INVENTION

The present invention relates to a system and method for classification of passenger vehicles and measuring their properties, and more particularly to a stochastic multi-class vehicle classification system, which classifies a vehicle (given its direct rear-side view) into one of four classes Sedan, Pickup truck, SUV/Minivan, and unknown, and wherein a feature pool of tail light and vehicle dimensions is extracted, which feeds a feature selection algorithm to define a low-dimensional feature vector, and the feature vector is then processed by a Hybrid Dynamic Bayesian Network (HDBN) to classify each vehicle.

BACKGROUND OF THE INVENTION

Over the past few years vehicle classification has been widely studied as part of the broader vehicle recognition research area. A vehicle classification system is essential for effective transportation systems (e.g., traffic management and toll systems), parking optimization, law enforcement, autonomous navigation, etc. A common approach utilizes vision-based methods to detect and classify a vehicle in still images and video streams. A human being may be capable of identifying the class of a vehicle with a quick glance at the digital data (image, video) but accomplishing that with a computer is not as straight forward. Several problems such as occlusion, tracking a moving object, shadows, rotation, lack of color invariance, and many more must be carefully considered in order to design an effective and robust automatic vehicle classification system. Much research has been conducted for object classification, but vehicle classification has shown to have its own specific problems, which motivates research in this area.

Not much has been done on vehicle classification from the rear view. For the side view, appearance based methods especially edge-based methods have been widely used for vehicle classification. These approaches utilize various methods such as weighted edge matching, Gabor features, edge models, shape based classifiers, part based modeling, and edge point groups. Model-based approaches that use additional prior shape information have also been investigated in 2D (two-dimensions) and more recently in 3D (three-dimensions).

Vehicle make and model classification from the frontal view has also been investigated (i.e., high resolution, close up frontal view images, neural network classifier), and also (SIFT features). For the rear view, Dlagnekov extends a new license plate recognition system to perform vehicle make and model recognition for video surveillance using a database of partial license plate and vehicle visual description data. Adaboost and cascaded classifiers are used to detect the license plate. Given the license plate, visual features are extracted using two feature-based methods (SIFT and shape context matching) and one appearance-based method (Eigencars). The drawbacks of the proposed system are that it does not perform color inference, is relatively slow, and only the license plate recognition stage is done in real-time.

SUMMARY

Vehicle classification has evolved into a significant subject of study due to its importance in autonomous navigation, traffic analysis, surveillance and security systems, and transportation management. While numerous approaches have been introduced for this purpose, no specific study has been able to provide a robust and complete video-based vehicle classification system based on the rear-side view where the camera's field of view is directly behind the vehicle. In accordance with an embodiment, a stochastic multi-class vehicle classification system is presented, which classifies a vehicle (given its direct rear-side view) into one of four classes Sedan, Pickup truck, SUV/Minivan, and unknown. A feature pool of low-level tail light and vehicle dimension features is extracted, which feeds a feature selection algorithm to define a low-dimensional feature vector. The feature vector is then processed by a Hybrid Dynamic Bayesian Network (HDBN) to classify each vehicle.

In accordance with an exemplary embodiment, a method for vehicle classification comprises: performing a Bayesian network analysis for vehicle classifications, which are known, wherein the Bayesian network is defined as a directed acyclic graph G=(V, E) where the nodes (vertices) represent random variables from the domain of interest and the arcs (edges) symbolize the direct dependencies between the random variables.

In accordance with a further exemplary embodiment, a system for classification of vehicles comprises: a camera for capturing images of at least one moving object; and a computer processing unit, which performs the steps as recited herein.

In accordance with another exemplary embodiment, a computer program product comprising a non-transitory computer usable medium having a computer readable code embodied therein for classification of passenger vehicles and measuring their properties from a rear view video frame, the computer readable program code is configured to execute a process, which performs the steps as recited herein.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
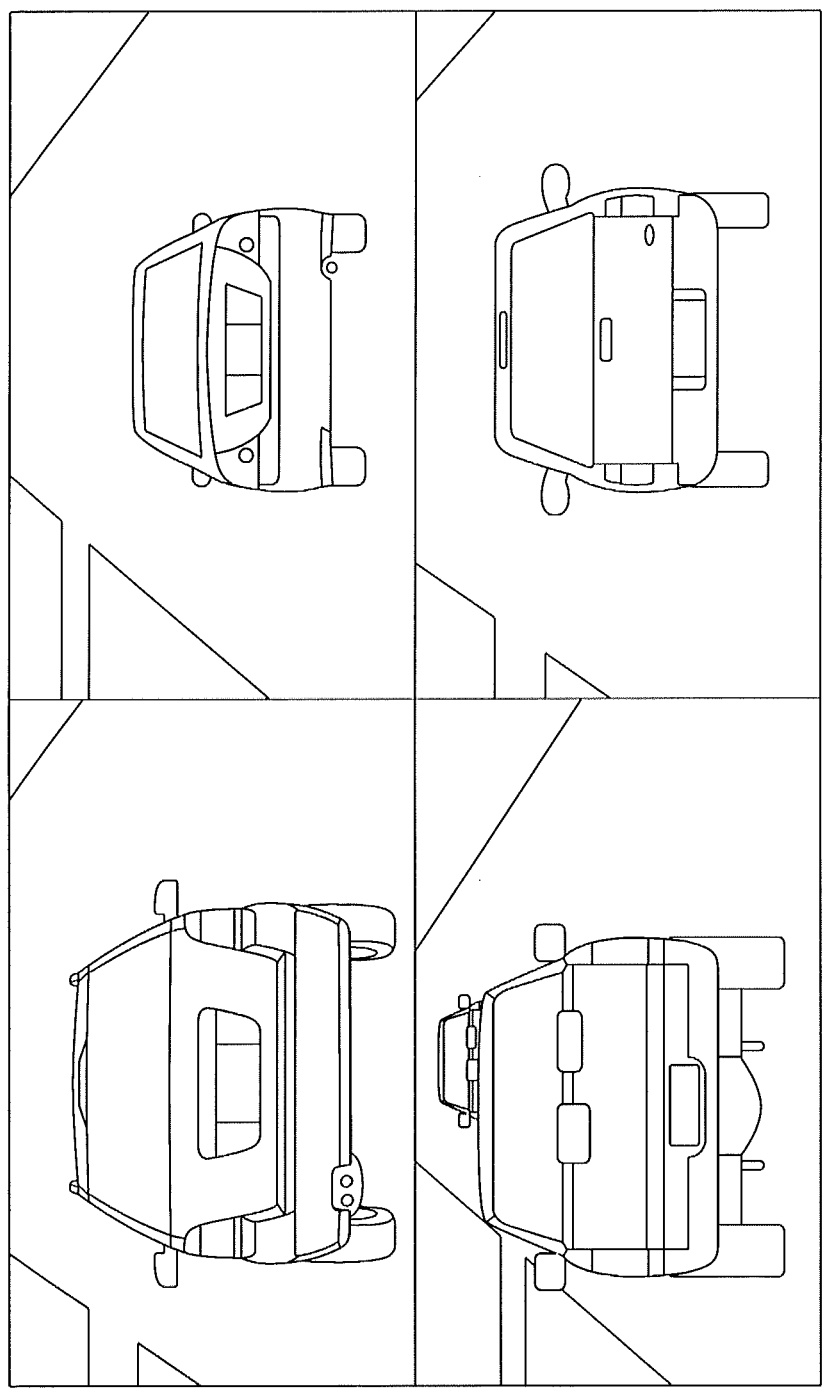
FIG. 1 shows a series of images of a direct rear view of a moving vehicle.

In accordance with an exemplary embodiment, a probabilistic classification framework is disclosed, which determines the class of a vehicle given its direct rear view (FIG. 1). It can be appreciated that the main classes can include Sedan, Pickup truck, SUV/minivan, and also a class for unknown vehicles. In accordance with an embodiment, SUVs and minivans were combined because the number of available minivans in the dataset was small. However, it would be desirable to distinguish minivans from SUVs after obtaining a reasonable number of minivans for our training dataset.

In accordance with an exemplary embodiment, the direct rear view is chosen for two main reasons. First, most of the research in this area has focused on the side view, whereas the frontal view and rear view have been less investigated. Secondly, the license place location is a descriptive feature of a vehicle's class (e.g., usually pickup truck's license plate is mounted on the bumper) but not all states require a front license plate (e.g., 19 states in the USA require only the rear license plate).

In accordance with an exemplary embodiment, a Hybrid Dynamic Bayesian Network (HDBN) classifier with multiple time slices corresponding to multiple video frames to increase classification accuracy is disclosed. In accordance with an exemplary embodiment, the need for high resolution images/videos is eliminated by using simple low-level features (e.g., height, width, and angle), which are also computationally inexpensive, thus, the proposed method is capable of running in real-time.

Technical Approach

Figure 2:
FIG. 2 shows the complete system framework for vehicle classification in video in accordance with an exemplary embodiment.

The complete proposed system pipeline is shown in FIG. 2, which includes data collection, feature extraction, feature selection, and classification. Each of the components are explained in the following sections.

Feature Extraction

In accordance with an embodiment, three main types of features are extracted from the images; tail lights, license plate, and rear dimensions. The tail light features include separately for each tail light, a width, distance from the license plate, and an angle between tail light and license plate. The license plate location and size is used as a reference to enable comparison and help normalize tail light properties and vehicle size values. The feature extraction component consists of three subcomponents: vehicle detection, license plate extraction, and tail light extraction.

Vehicle Detection

In accordance with an embodiment, a Gaussian mixture model approach is used for moving object detection. The Gaussian distributions are used to determine if a pixel is more likely to belong to the background model or not. An AND approach is used which determines a pixel as background only if it falls within three standard deviations for all the components in all three R, G, and B color channels (i.e., red, green, and blue color channels). The detected moving object is validated by using a simple frame differencing approach and cross checking the masks from both methods.

Figure 3:
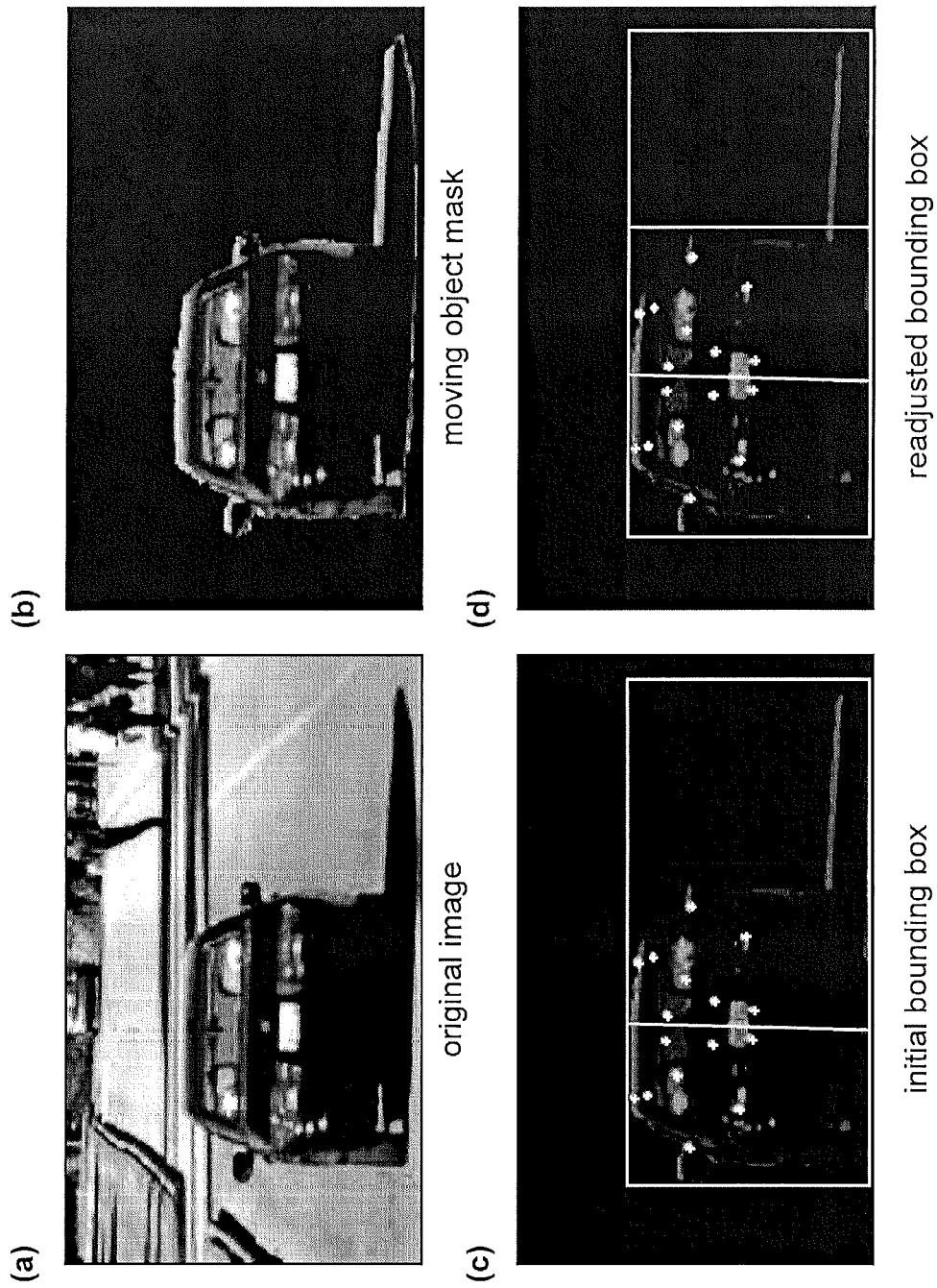
FIG. 3 shows shadow removal and obtaining a bounding box in accordance with an exemplary embodiment.

The resulting mask may include some shadow and erroneous pixels. The shadow is removed by finding the vertical axis of symmetry using an accelerated version of Loy's symmetry and readjusting the bounding box containing the mask with respect to the axis of symmetry. This is preferably done by measuring the distance between each point on both vertical sides of the bounding box and the axis symmetry and moving the vertical side that is farther away closer to the axis of symmetry such that each side has the same distance from it. FIG. 3 shows results from multiple steps of this approach. The aforementioned shadow removal method fails if the shadow is behind the vehicle. In such cases, the shadow is preferably removed using the approach introduced by Nadimi et al., which does not rely on the common geometrical assumptions such as camera location, object geometry, and ground surface geometry. Given the vehicle rear mask, the height and width of the bounding box and area of the mask are measured.

License Plate Extraction

The license plate corner coordinates are input into the algorithm. It can be appreciated that there are a number of algorithms for license plate extraction. In accordance with an exemplary embodiment, the corners of the license plate are manually extracted. To have more realistic license plate location coordinates, Gaussian noise with constant mean 0 and variance 0.2 time width is added to the license plate width measurement.

Tail Light Extraction

Figure 4:
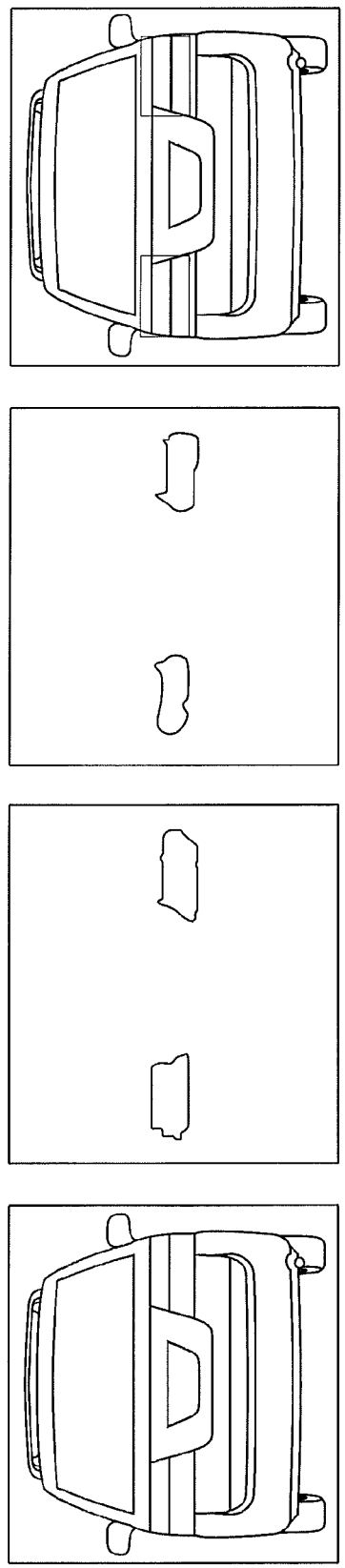
FIG. 4 shows a series of images for tail light detection in accordance with an exemplary embodiment.

For tail light detection, the regions of the image where red color pixels are dominant are located. The redness of each image pixel can be computed by fusing two methods. In the first approach, the image is converted to HSV (hue, saturation, and value) color space and then pixels are classified into three main color groups red, green, and blue. The second method proposed by Gao et. al defines the red level of each pixel as $$r_i = \frac{2r_i}{G_i + B_i}$$

in RGB (red, green, blue) color space. A bounding box surrounding each tail light is generated by combining results from both methods and checking if the regions with high redness can be a tail light (e.g., are symmetric, are close to the edges of the vehicle). FIG. 4 presents results of the two methods and the combined results as two bounding boxes. It can be appreciated that both these methods fail, if the vehicle body color is red itself. To overcome this, in accordance with another exemplary embodiment, the vehicle color is estimated using a HSV color space histogram analysis approach, which determines if the vehicle is red or not. If a red vehicle is detected, the tail light detection component is enhanced by adding an extra level of post-processing, which can include Otsu's thresholding, color segmentation, removing large and small regions, and symmetry analysis. After the tail lights are detected, the width, centroid, and distance and angle with the license plate are separately computed for both left and right tail lights Feature Pool As the result of the feature extraction component, the following 11 features are extracted from each image frame (all distances are normalized with respect to the license plate width):

1. perpendicular distance from license plate centroid to a line connecting two tail light centroids;
2. right tail light width;
3. left tail light width;
4. right tail light-license plate angle;
5. left tail light-license plate angle;
6. right tail light-license plate distance;
7. left tail light-license plate distance;
8. bounding box width;
9. bounding box height;
10. license plate distance to bounding box bottom side; and
11. vehicle mask area.

Given a set of features Y, feature selection determines a subset X which optimizes an evaluation criterion J. Feature selection is performed for various reasons including improving classification accuracy, shortening computational time, reducing measurements costs, and relieving the curse of dimensionality. In accordance with an exemplary embodiment, a Sequential Floating Forward Selection (SFFS) was chosen, which returns a single suboptimal solution. SFFS starts from an empty set and adds the most significant features (e.g., features that increase accuracy the most). The SFFS provides a kind of back tracking by removing the least significant feature during the third step, conditional exclusion. A stopping condition is required to halt the SFFS algorithm, therefore, in accordance with an exemplary embodiment, the number of feature selection iterative steps is limited to $2^{n-1}$ (where n is the number of features) and a correct classification rate (CCR) threshold of b % where b is greater than the CCR of the case when all features are used is defined. In other words, the algorithm stops when either the CCR is greater than b %, or $2^{n-1}$ iterations are completed. The pseudo code for SFFS is shown below, wherein k is the number of features already selected.

1. Initialization: k=0; $X_0=\{\emptyset\}$
2. Inclusion: add the most significant feature
   $X_{k+1}=\arg\max_{x \in (y-X_k)}[J(X_k+x)]$
   $X_{k+1}=X_k+x_{k+1}$; repeat step 2 if k<2
3. Conditional Exclusion: find the least significant feature and remove (if not last added)
   $x_r=\arg\max_{x \in X_k}[J(X_k-x)]$
   if $x_r=x_{k+1}$ then k=k+1; Go to step 1
   else $X'_k=X_{k-1}-x_r$
4. Continuation of Conditional Exclusion
   $x_s=\arg\max_{x \in x'_k}[J(X'_k-x)]$
   if $J(X'_k-x_s) \leq J(X_{k-1})$ then
   $X_k=X'_k$; Go to step 2
   else $X'_{k-1}=X'_k-x_s$; k=k+1
5. Stopping Condition Check
   if halt_condition=true then STOP
   else Go to step 4

Figure 5:
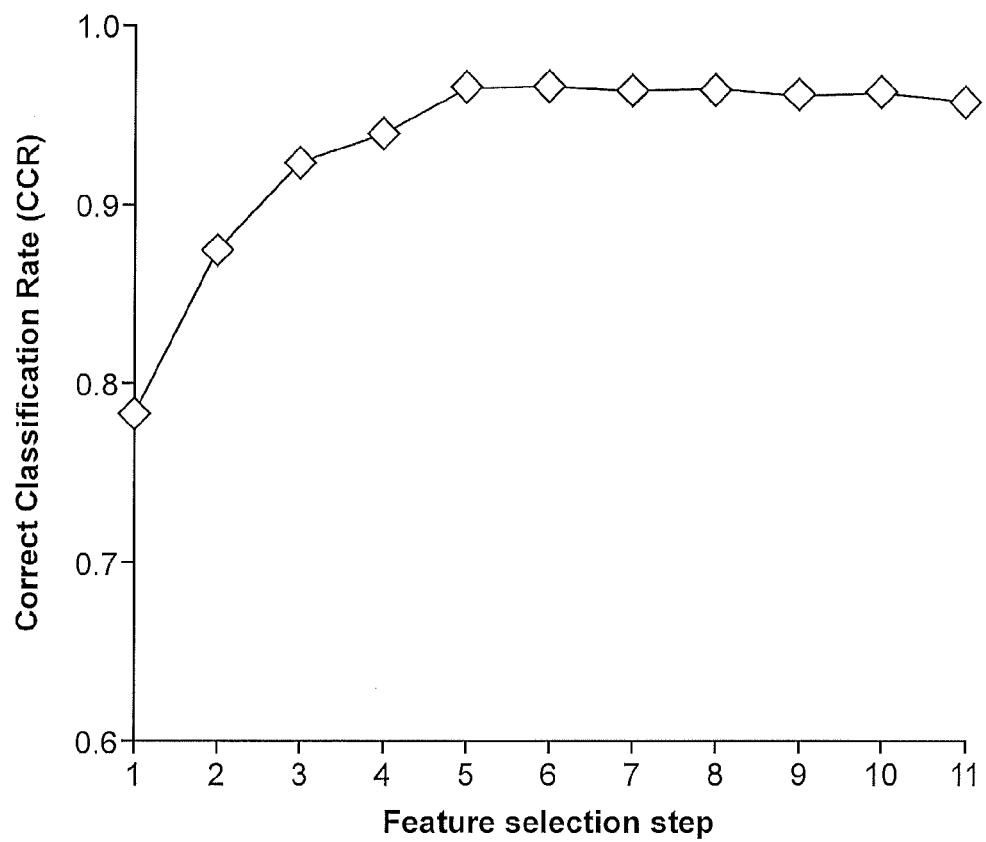
FIG. 5 shows a feature selection subset correct classification rate (CCR) plot.

FIG. 5 shows the correct classification rate plot with feature selection steps as the x-axis and correct classification rate as the y-axis. The plot peaks at x=5 and the algorithm returns features 1, 4, 6, 10, and 11 as the suboptimal solution.

Classification

1) Known or Unknown

The classification component consists of a two stage approach. Initially, the vehicle feature vector is classified as known or unknown. To do such, the Gaussian distribution parameters of the distance to the nearest neighbor for all vehicles in the training dataset are estimated. To determine if a vehicle test case is known or unknown first the distance to its nearest neighbor is computed. Then following the empirical rule if the distance does not lie within 4 standard deviations of the mean ($\mu \pm 4\sigma$) it is classified as unknown. If the vehicle is classified as known it is a candidate for the second stage of classification.

2) DBNs for Classification

In accordance with an exemplary embodiment, the use of a Dynamic Bayesian Networks (DBNs) for vehicle classification in video is proposed.

Bayesian networks offer a very effective way to represent and factor joint probability distributions in a graphical manner, which makes them suitable for classification purposes. A Bayesian network is defined as a directed acyclic graph G=(V, E) where the nodes (vertices) represent random variables from the domain of interest and the arcs (edges) symbolize the direct dependencies between the random variables. For a Bayesian network with n nodes $X_1$, $X_2, \ldots, X_n$ the full joint distribution is defined as:

$$p(x_1, x_2, \ldots, x_n) = p(x_1) \times p(x_2|x_1) \times \ldots \times p(x_n|x_1, x_2, \ldots, x_{i-1}) = \prod_{i=1}^{n} p(x_i|x_1, \ldots, x_{i-1})$$

but a node in a Bayesian network is only conditional on its parent's values so $$p(x_1, x_2, \ldots, x_n) = \prod_{i=1}^{n} p(x_i | \text{parents}(X_i))$$

where $p(x_1, x_2, \ldots, x_n)$ is an abbreviation for $p(X_1=x_1 \wedge \ldots \wedge X_n=x_n)$. In other words, a Bayesian network models a probability distribution if each variable is conditionally independent of all its non-descendants in the graph given the value of its parents.

Figure 6:
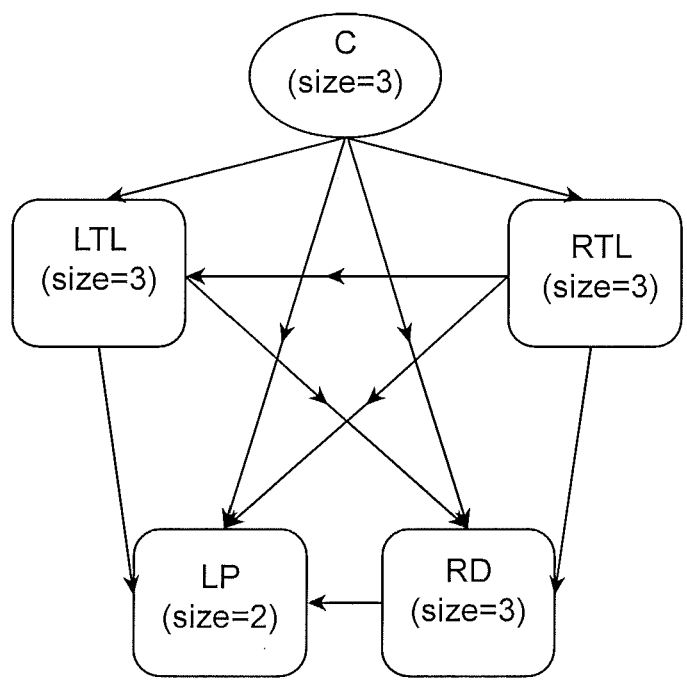
FIGS. 6(a) and 6(b) show Bayesian Network Structures in accordance with an exemplary embodiment.
Figure 6:
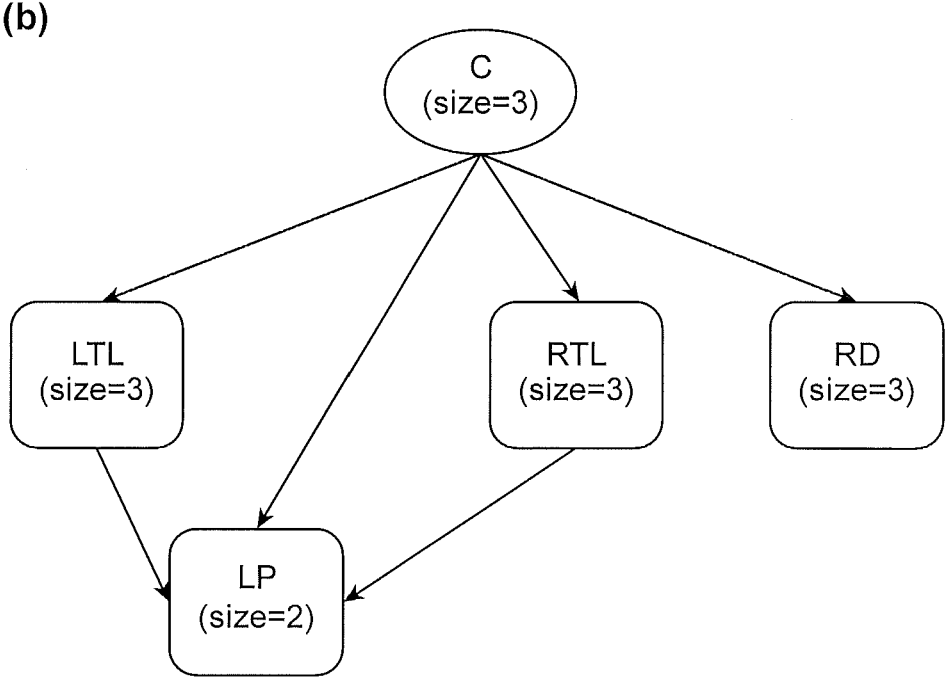

In accordance with an embodiment, the accuracy of the model is based on the structure of the Bayesian network. For example, learning the best structure/topology for a Bayesian network takes exponential time because the numbers of possible structures for a set of given nodes is super-exponential in the number of nodes. To avoid performing exhaustive search, a K2 algorithm (Cooper and Herskovits, 1992) may be used to determine a sub-optimal structure. K2 is a greedy algorithm that incrementally add parents to a node according to a score function. In accordance with an exemplary embodiment, a BIC (Bayesian Information Criterion) function may be used as the scoring function. FIG. 6(a) illustrates the resulting Bayesian network structure. In accordance with another exemplary embodiment, a manually structured network (FIG. 6(b)) is defined and the two structures are compared. The details for each node are as following:

1. C: vehicle class, discrete hidden node, size=3
2. LP: license plate, continuous observed node, size=2
3. LTL: left tail light, continuous observed node, size=3
4. RTL: right tail light, continuous observed node, size=3
5. RD: rear dimensions, continuous observed node, size=3

For continuous nodes the size indicates the number of features each node is representing, and for the discrete node C it denotes the number of classes. RTL and LTL are continuous nodes and each contain the normalized width, angle with the license plate, and normalized Euclidean distance with the license plate centroid. LP is a continuous node with distance to the bounding box bottom side and perpendicular distance to the line connecting the two tail light centroids as its features. RD is a continuous node with bounding box width and height, and vehicle mask area as its features. For each continuous node of size n, a multivariate Gaussian conditional probability distribution (CPD) is defined, where each feature of each continuous node has $\mu=[\mu_1, \ldots \mu_n]^T$ and $\Sigma$ as an n×n symmetric, positive definite covariance matrix. The discrete node C has a corresponding conditional probability table (CPT) assigned to it which defines the probabilities P(C=sedan), P(C=pickup), and P(C=SUV or minivan).

Adding a temporal dimension to a standard Bayesian network creates a DBN. The time dimension is explicit, discrete, and helps model a probability distribution over a time-invariant process. In accordance with an exemplary embodiment, a DBN is created by replicating a Bayesian network with time-dependent random variables over T time slices. A new set of arcs defining the transition model is also used to determine how various random variables are related between time slices.

In accordance with an exemplary embodiment, a video based classifier is modeled by extending the aforementioned Bayesian network (FIG. 6(b)) to a DBN. The DBN structure is defined as following:

1. for each time slice $t_{i, i=1, 2, \ldots, 5}$ the DBN structure is similar to the Bayesian network structure given in FIG. 6(b).
2. each feature $X_i^t$ is the parent of $X_i^{t+1}$.
3. C' is the parent of $C^{t+1}$.
4. all intra slice dependencies (arcs) also hold as inter time slices except for arcs from time slice t hidden nodes to time slice t+1 observed nodes.

Figure 7:
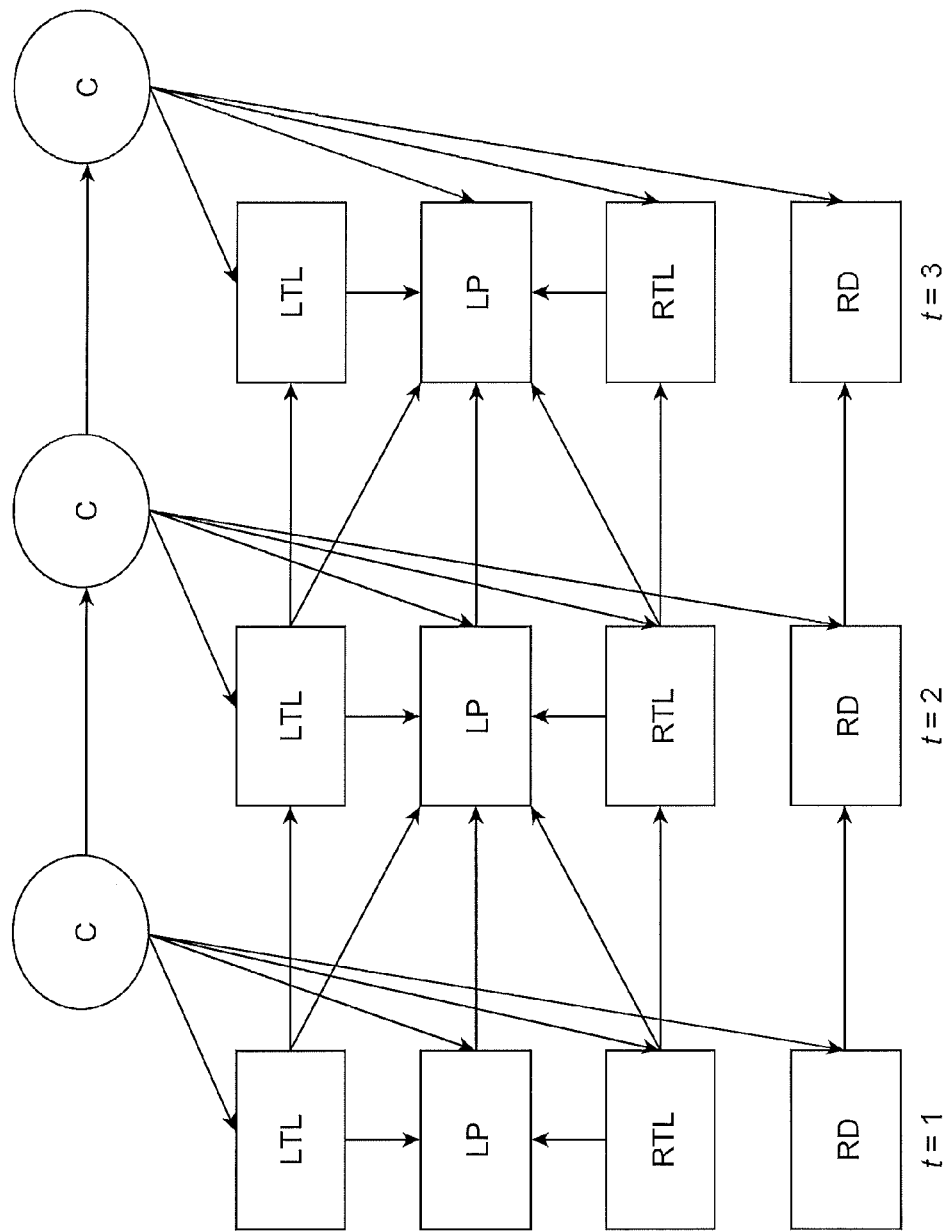
FIG. 7 shows a Dynamic Bayesian Network (DBN) structure for time slices $t_i$, wherein i=1, 2, 3 in accordance with an exemplary embodiment.

FIG. 7 demonstrates the DBN structure for 3 time slices. It can be appreciated that such a network is identified as a Hybrid Dynamic Bayesian Network (HDBN) because it consists of discrete and continuous nodes. Training the HDBN or in other words learning the parameters of the HDBN is required before classification is performed. Therefore, the probability distribution for each node given its parents should be determined. For time slice $t_1$ this includes p(LTL|C), p(RTL|C), p(RD|C), p(LP|C,LTL,RTL), and p(C). For time slices $t_{i,i=2,\ldots,5}$ it includes:

$p(LTL^t|C^t, LTL^{t-1})$, $p(RTL^t|C^t, RTL^{t-1})$
$p(C^t|C^{t-1})$, $p(RD^t|C^t, RD^{t-1})$
$p(LP^t|C^t, LTL^t, RTL^t, LP^{t-1}, LTL^{t-1}, RTL^{t-1})$

For example, to determine $p(LTL^t|C^t, LTL^{t-1})$ three distributions with different parameters, one for each value of $C^t$, are required. Hence, $p(LTL^t|LTL^{t-1}, C^t=\text{sedan})$, $p(LTL^t|LTL^{t-1}, C^t=\text{pickup})$, and $p(LTL^t|LTL^{t-1}, C^t=\text{SUV or Minivan})$ are estimated, and $p(LTL^t|LTL^{t-1})$ is derived by summing over all the $C^t$ cases.

The next step is inference where a probability distribution over the set of vehicle classes is assigned to the feature vector representing a vehicle. In other words inference provides $p(C^t|f^{(1:t)})$ where $f^{(1:t)}$ refers to all features from time slice $t_1$ to $t_5$.

Experiments

Data Collection

In accordance with an exemplary embodiment, video data of passing vehicles was captured using a Sony HDR-SR12 Video Camera. The videos are taken in the early afternoon with sunny and partly cloudy conditions. Lossless compressed PNG image files were extracted from the original HD MPEG4 AVC/H.264 video format, and then down sampled from 1440×1080 to 320×240 using bicubic interpolation. Downsampling is performed to reduce the computation time. All image frames were manually labeled with the vehicle class to provide the ground-truth for evaluation purposes.

The dataset consists of 100 sedans, 27 pickup trucks, and 42 SUV/minivans. Before extracting the features and generating the feature pool, it is important to determine the number of frames required for classification. Classification accuracy was recorded for different number of frames. The maximum accuracy is achieved when 5 frames are used. Note that these frames are not successive. In accordance with an exemplary embodiment, Δt=2 was used, which means leaving out two frames between candidate frames. This value is directly related to the speed of the vehicle and the overall time the vehicle is visible in the camera's field of view.

Figure 8:
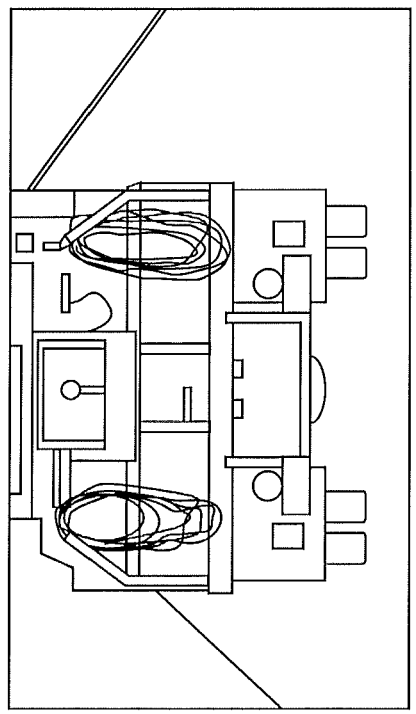
FIG. 8 shows a series of images of examples of unknown vehicles.
Figure 8:
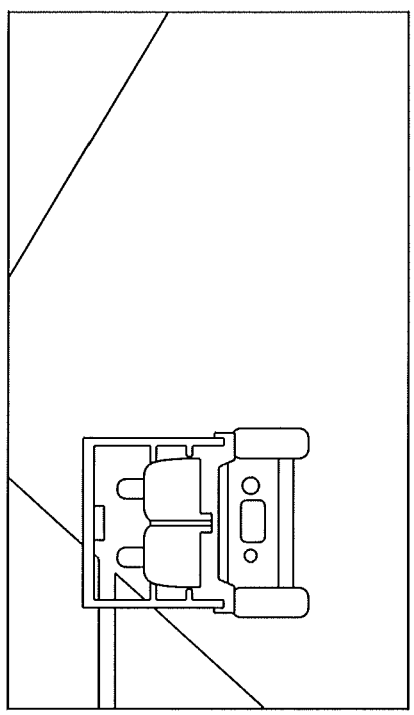

To evaluate how well the algorithm performs in the case of an unknown vehicle, 8 unknown vehicles were collected, which were not part of the training dataset. FIG. 8 shows two examples of unknown vehicles.

Figure 9:
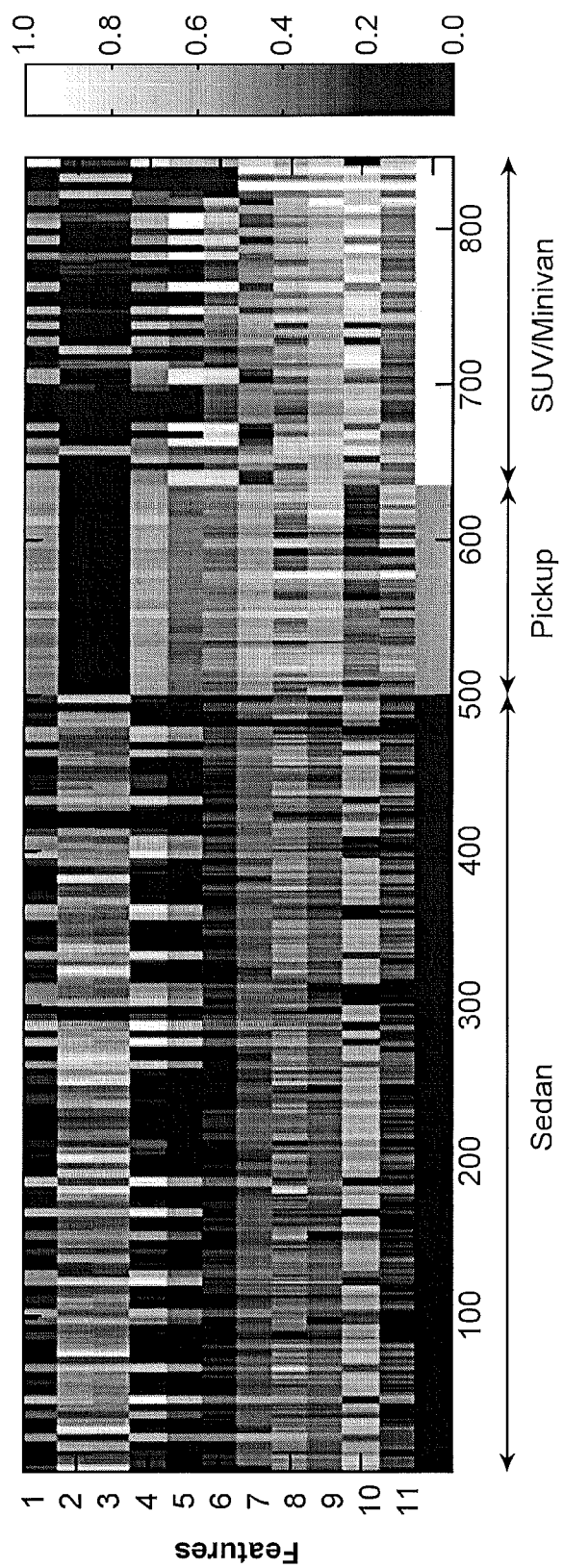
FIG. 9 shows a pattern feature matrix for different vehicles in accordance with an exemplary embodiment.

FIG. 9 shows the corresponding pattern-feature matrix. The y-axis represents the extracted features and the x-axis symbolizes all 845 (169 vehicles times 5 frames) feature vectors. For presentation purposes each row has been normalized by dividing by the maximum value of the same feature.

Feature Selection Evaluation

Table I shows classification evaluation metrics both when (a) using the entire feature set, and (b) using a suboptimal subset. Results show that using the subset of the features generated by SFFS decreases the accuracy and precision by approximately 1%. Feature selection also decreases the average testing time per frame from 0.05 to 0.03 seconds.

TABLE 1

Feature Selection Results

| FS Method | Selected features | Precision | FA Rate | CCR | Testing time(s) |
|---|---|---|---|---|---|
| (a) None | all | 95.68 | 0.02 | 97.63 | 0.05 |
| (b) SFFS | 1, 4, 6, 10, 11 | 94.23 | 0.03 | 96.68 | 0.03 |

Classification Results

Figure 10:
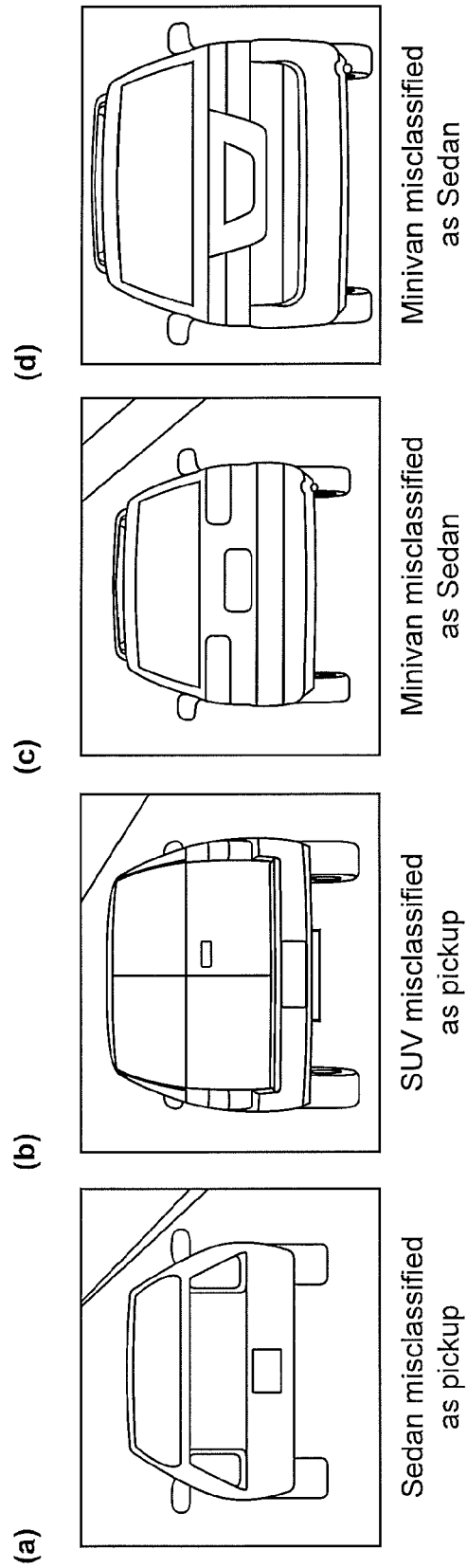
FIG. 10 shows a series of images of examples of misclassification in accordance with an exemplary embodiment.

In accordance with an exemplary embodiment, a Bayes Net Toolbox (BNT), an open source Matlab package, was used for defining the DBN structure, parameter learning, and computing the marginal distribution on the class node. In accordance with an exemplary embodiment, the proposed classification system was tested on a dataset consisting of 169 known and 8 unknown vehicles. A stratified k-fold cross-validation with k=10 was used to evaluate the approach. The resulting confusion matrix is shown in Table II. As shown, all sedans are correctly classified except for the one that is misclassified as a pickup truck (FIG. 10(a)). FIG. 10(b) shows an SUV misclassified as a pickup truck. A closer look at the data and pattern-feature matrix shows great similarity for both these cases with the pickup class due to the license plate location and rear tail light width.

TABLE II

Confusion Matrix

| True Class | Pred. Class | | | | |
|---|---|---|---|---|---|
| | Unknown | Sedan | Pickup | SUV/Minivan | Total |
| Unknown | 8 | 0 | 0 | 0 | 8 |
| Sedan | 0 | 99 | 1 | 0 | 100 |
| Pickup | 0 | 0 | 27 | 0 | 27 |
| SUV/Minivan | 0 | 3 | 2 | 37 | 42 |

Structure Learning Evaluation

Table III presents the classification evaluation metrics for the two structures given in FIG. 6(a) and FIG. 6(b). The results show that learning the structure using K2 decreases the classification accuracy and precision. This is because the K2 search algorithm requires a known linear ordering of nodes prior to model selection. One way to overcome this is to determine the ordering of nodes prior to performing K2. Determining the required ordering using a dynamic programming approach takes $O(n^2 2^n)$ time and $O(n 2^n)$ space where n is the number of nodes. The linear order determines the possible parent candidates for each node in a way that the BN is guaranteed to be an acyclic graph.

TABLE III

Structure Learning Evaluation

| Structure Learning | Precision | FA Rate | CCR |
|---|---|---|---|
| K2&BIC (FIG. 6(a)) | 93.68 | 0.04 | 96.06 |
| Manual (FIG. 6(b)) | 95.68 | 0.02 | 97.63 |

Comparison with Other Methods

The results were compared with 3 well-known classifiers: k-nearest neighbor (kNN), linear discriminant analysis (LDA), and support vector machines (SVM). Tables IV, V, and VI show classification accuracy, false positive ratio (false alarm), and precision respectively. The class "unknown" is not included in computing the results for Tables IV, V, and VI.

TABLE IV

CCR COMPARISON

| Vehicle Class | Classifier | | | |
|---|---|---|---|---|
| | kNN | LDA | SVM | HDBN |
| Sedan | 88.25 | 94.67 | 96.44 | 97.63 |
| Pickup | 95.12 | 94.67 | 96.44 | 98.22 |
| SUV/Minivan | 90.90 | 92-89 | 92.30 | 97.04 |
| Overall | 91.42 | 94.07 | 95.06 | 97.63 |

TABLE V

FALSE ALARM PERCENTAGES COMPARISON

| Vehicle Class | Classifier | | | |
|---|---|---|---|---|
| | kNN | LDA | SVM | HBN |
| Sedan | 0.17 | 0.07 | 0.06 | 0.04 |
| Pickup | 0.04 | 0.05 | 0.03 | 0.02 |
| SUV/Minivan | 0.04 | 0.02 | 0.04 | 0 |
| Overall | 0.09 | 0.05 | 0.04 | 0.02 |

TABLE VI

PRECISION PERCENTAGES COMPARISON

| Vehicle Class | Classifier | | | |
|---|---|---|---|---|
| | kNN | LDA | SVM | HBN |
| Sedan | 88.46 | 95.05 | 96.07 | 97.05 |
| Pickup | 80.64 | 78.13 | 86.20 | 90.00 |
| SUV/Minivan | 85.29 | 91.67 | 87.17 | 100 |
| Overall | 84.80 | 88.28 | 89.81 | 95.68 |

Figure 11:
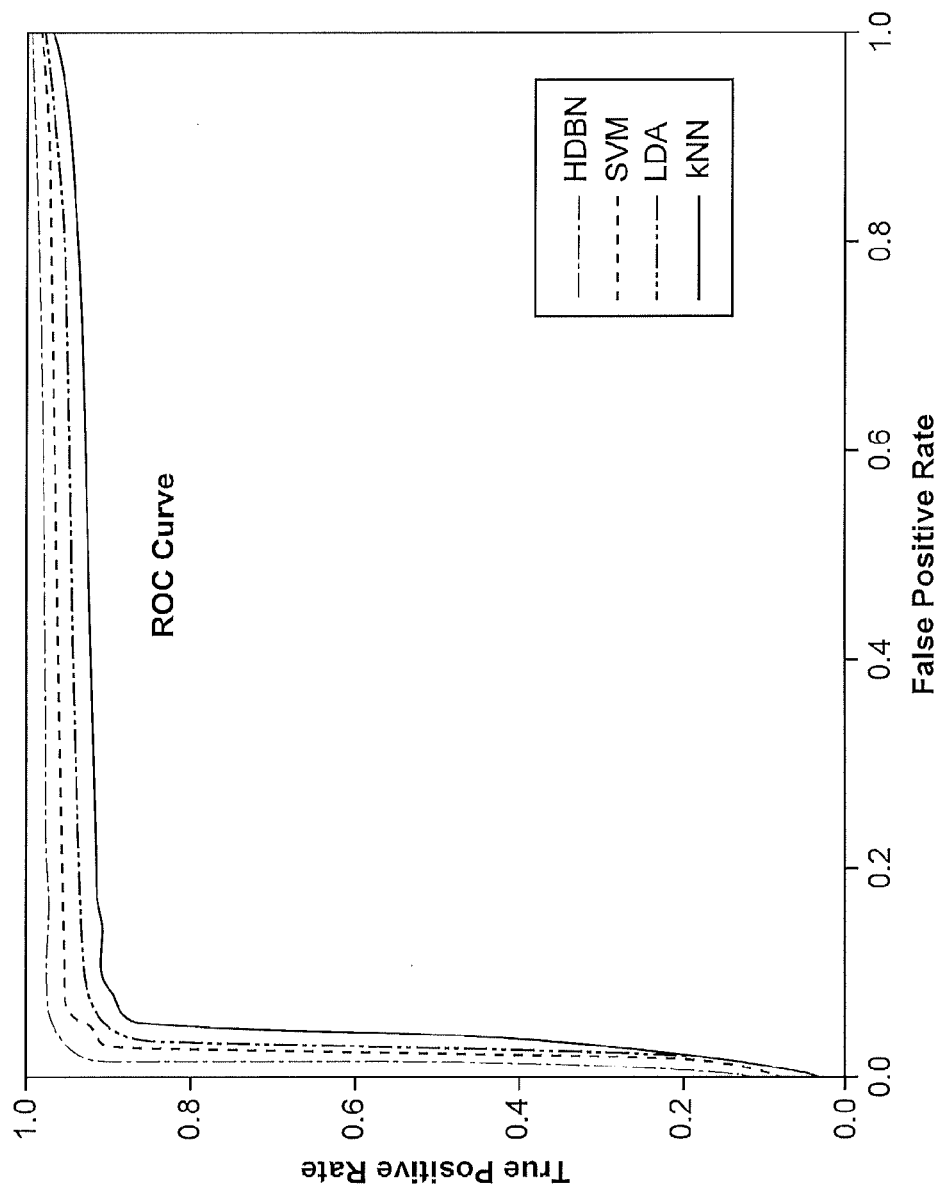
FIG. 11 shows a performance Receiver Operating Characteristic (ROC) plot in accordance with an exemplary embodiment.

FIG. 11 shows the Receiver Operating Characteristic (ROC) curves for all the four classifiers. Although the ROC curves are similar, it is clear that HDBN outperforms SVM, LDA, and KNN.

CONCLUSION

In accordance with an exemplary embodiment, a Dynamic Bayesian Network for vehicle classification using multiple video frames in a DBN structure can outperform well known classifiers such as kNN, LDA, and SVM. Experimental results showed that obtaining high classification accuracy does not always require high level features and simple features (e.g., normalized distance and angle) may also provide such results making it possible to perform real-time classification.

In accordance with another exemplary embodiment, a computer program product comprising a non-transitory computer usable medium having a computer readable code embodied therein for classification of passenger vehicles and measuring their properties from a rear view video frame, the computer readable program code is configured to execute a process, which performs the steps as recited herein.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A method for vehicle classification comprising:
   detecting at least three subcomponents, the at least three subcomponents comprising vehicle detection, license plate extraction, and tail light extraction;
   using a Gaussian mixture model approach for detection of a moving object, wherein the Gaussian mixture model comprises Gaussian distributions to determine if a pixel is more likely to belong to a background model or not, and an AND approach, which determines a pixel as background only if the pixel falls within three standard deviations for all the components in all three R, G, and B color channels;
   validating detected moving objects by using a simple frame differencing approach;
   removing shadows and erroneous pixels by finding a vertical axis of symmetry using an accelerated version of Loy's symmetry and readjusting a bounding box containing a mask with respect to an axis of symmetry, wherein if the shadow is behind the vehicle, removing the shadow using geometrical assumptions such as camera location, object geometry, and ground surface geometry, and wherein given the vehicle rear mask, measuring a height and width of the bounding box, and area of the mask;
   inputting the license plate corner coordinates into an algorithm for license plate extraction, and adding a Gaussian noise with constant mean 0 and variance 0.2 times width to the license plate width measurement; and
   performing a Bayesian network analysis on the at least three detected subcomponents for a plurality of vehicle classifications, wherein the Bayesian network analysis is defined as a directed acyclic graph G=(V, E), where nodes represent random variables from a domain of interest and arcs symbolize direct dependencies between the random variables.

2. The method of claim 1, wherein for a Bayesian network with n nodes $X_1, X_2, \ldots X_n$, a full joint distribution is defined as:

$$p(x_1, x_2, \ldots, x_n) = p(x_1) \times p(x_2 \mid x_1) \times \ldots \times p(x_n \mid x_1, x_2, \ldots, x_{i-1}) = \prod_{i=1}^{n} p(x_i \mid x_1, \ldots, x_{i-1})$$

but a node in a Bayesian network is only conditional on its parent's values so $$p(x_1, x_2, \ldots, x_n) = \prod_{i=1}^{n} p(x_i \mid \text{parents}(X_i))$$

where $p(x_1, x_2, \ldots, x_n)$ is an abbreviation for $p(X_1=x_1 \ldots X_n=x_n)$.

3. The method of claim 2, further comprising using a K2 algorithm to determine a sub-optimal structure.

4. The method of claim 3, comprising:
   generating a manually structured network and comparing the sub-optimal structure to the manually structured network.

5. The method of claim 4, comprising:
   adding a temporal dimension to the Bayesian network to create a Dynamic Bayesian Network (DBN structure).

6. The method of claim 5, comprising:
   replicating the Bayesian network with time-dependent random variables over T time slices, and wherein a new set of arcs defining the transition model is used to determine how various random variables are related between time slices.

7. The method of claim 6, wherein the DBN structure is defined as following:
   for each time slice $t_{i,\ i=1, 2, \ldots, 5}$;
   each feature $x_i^t$ is the parent of $x_i^{t+1}$;
   $C^t$ is the parent of $C^{t+1}$; and
   all intra slice dependencies also hold as inter time slices except for arcs from time slice t hidden nodes to time slice t+1 observed nodes.

8. The method of claim 7, comprising:
   generating a Hybrid Dynamic Bayesian Network (HDBN), which consists of discrete and continuous nodes, and wherein parameters of the HDBN are required before classification is performed.

9. The method of claim 8, wherein the plurality of vehicle classifications include at least one or more of the following:
   Sedan, Pickup, and SUV or Minivan.

10. The method of claim 1, comprising:
    generating a complete system framework, which includes data collection, feature extraction, feature selection, and classification.

11. The method of claim 10, comprising:
    extracting features from images of a rear view of a vehicle.

12. The method of claim 11, comprising:
    extracting tail light features, wherein the tail light features include separately for each tail light a width, a distance from the license plate, and an angle between the tail light and the license plate.

13. The method of claim 12, comprising:
    extracting license plate features, the license plate features including the license plate location and a size thereof is used as a reference to enable comparison and normalize the tail light features and the vehicle size values.

14. The method of claim 1, comprising:
    performing a tail light extraction by fusing two methods, a first method wherein an image is converted to hue, saturation and value (HSV) color space and classifying pixels into three main color groups red, green, and blue, and a second method, which defines the red level of each pixel as $$r_i = \frac{2r_i}{G_i + B_i}$$

in red, green and blue (RGB) color space.

15. The method of claim 14, comprising:
    generating a bounding box surrounding each tail light by combining results from both methods and checking if the regions with high redness can be a tail light.

16. The method of claim 15, wherein if the vehicle body color is red itself, estimating a vehicle color using a hue, saturation and value (HSV) color space histogram analysis approach, which determines if the vehicle is red or not, and if a red vehicle is detected, the tail light detection component is enhanced by adding an extra level of post-processing which includes thresholding, color segmentation, removing large and small regions, and symmetry analysis, and after the tail lights are detected, separately computing width, centroid, and distance and angle with the license plate for both left and right tail lights.

17. The method of claim 16, comprising:
extracting one or more features for each image frame, and normalizing each distance with respect to the license plate width, the one or more features comprising:
perpendicular distance from license plate centroid to a line connecting two tail light centroids, right tail light width, left tail light width, right tail light license plate angle, left tail light license plate angle, right tail light license plate distance, left tail light license plate distance, bounding box width, bounding box height, license plate distance to bounding box bottom side, and/or vehicle mask area.

18. The method of claim 17, comprising:
optimizing an evaluation criterion to improve classification accuracy, shorten computational time, reduce measurements costs, and/or eliminate use of dimensionality.

19. The method of claim 18, comprising:
performing a Sequential Floating Forward Selection (SFFS), which is a deterministic statistical pattern recognition (SPR) feature selection method and returning a single suboptimal solution.

20. The method of claim 19, wherein SFFS starts from an empty set and adding features that increase accuracy and removing the least significant features during a conditional exclusion.

21. The method of claim 20, comprising:
a stopping condition, which halts the SFFS algorithm to limit the number of feature selection iterative steps to $2^{n-1}$, wherein n is the number of features and defining a correct classification rate (CCR) threshold of b %, where b is greater than the CCR of the case when all features are used.

22. The method of claim 21, wherein the classification is a two stage approach, which consists of estimating the Gaussian distribution parameters of the distance to the nearest neighbor for all vehicles in the training dataset and determining if a vehicle test case is known or unknown by initially computing the distance to its nearest neighbor.

23. The method of claim 22, comprising:
if the distance does not lie within 4 standard deviations of a mean ($\mu \pm 4\sigma$), classifying it as unknown, and if the vehicle is classified as known it is a candidate for a second stage of classification.

24. A system for classification of vehicles comprising:
a camera configured to capture images of at least one moving object; and
a computer processing unit configured to
detecting at least three subcomponents from the captured images of the at least one moving object, the at least three subcomponents comprising vehicle detection, license plate extraction, and tail light extraction;
use a Gaussian mixture model approach for detection of a moving object, wherein the Gaussian mixture model comprises Gaussian distributions to determine if a pixel is more likely to belong to a background model or not, and an AND approach, which determines a pixel as background only if the pixel falls within three standard deviations for all the components in all three R, G, and B color channels;
validating detected moving objects by using a simple frame differencinq approach;
remove shadows and erroneous pixels by finding a vertical axis of symmetry using an accelerated version of Loy's symmetry and readiusting a bounding box containing a mask with respect to an axis of symmetry, wherein if the shadow is behind the vehicle, removing the shadow using geometrical assumptions such as camera location, object geometry, and ground surface geometry, and wherein given the vehicle rear mask, measuring a height and width of the bounding box, and area of the mask;
input the license plate corner coordinates into an algorithm for license plate extraction, and adding a Gaussian noise with constant mean 0 and variance 0.2 times width to the license plate width measurement; and
perform a Bayesian network analysis on the at least three detected subcomponents for a plurality of vehicle classifications, wherein the Bayesian network is defined as a directed acyclic graph G=(V, E), where nodes represent random variables from a domain of interest and arcs symbolize direct dependencies between random variables.

25. The system of claim 24, wherein the computer processing unit further comprises:
a memory arrangement, a processing unit and an optional display unit configured to display data and/or classification of the distinct structures in the class.

26. The system of claim 24, wherein the camera is configured to capture video images.

27. A computer program product comprising a non-transitory computer usable medium having a computer readable code embodied therein for classification of passenger vehicles and measuring their properties from a rear view video frame, the computer readable program code is configured to execute a process, which:
detects at least three subcomponents from the captured images of the at least one moving object, the at least three subcomponents comprising vehicle detection, license plate extraction, and tail light extraction;
uses a Gaussian mixture model approach for detection of a moving object, wherein the Gaussian mixture model comprises Gaussian distributions to determine if a pixel is more likely to belong to a background model or not, and an AND approach, which determines a pixel as background only if the pixel falls within three standard deviations for all the components in all three R, G, and B color channels;
validates detected moving objects by using a simple frame differencing approach;
removes shadows and erroneous pixels by finding a vertical axis of symmetry using an accelerated version of Loy's symmetry and readjusting a bounding box containing a mask with respect to an axis of symmetry, wherein if the shadow is behind the vehicle, removing the shadow using geometrical assumptions such as camera location, object geometry, and ground surface geometry, and wherein given the vehicle rear mask, measuring a height and width of the bounding box, and area of the mask;
inputs the license plate corner coordinates into an algorithm for license plate extraction, and adding a Gaussian noise with constant mean 0 and variance 0.2 times width to the license plate width measurement; and
performs a Bayesian network analysis on the at least three detected subcomponents for a plurality of vehicle classifications, which are known, wherein the Bayesian network is defined as a directed acyclic graph G=(V, E), where nodes represent random variables from a domain of interest and arcs symbolize direct dependencies between random variables.

28. The system of claim 24, wherein for a Bayesian network with n nodes $X_1, X_2, \ldots X_n$, a full joint distribution is defined as:

$$p(x_1, x_2, \ldots, x_n) = p(x_1) \times p(x_2 \mid x_1) \times \ldots \times p(x_n \mid x_1, x_2, \ldots, x_{i-1}) = \prod_{i=1}^{n} p(x_i \mid x_1, \ldots, x_{i-1})$$

but a node in a Bayesian network is only conditional on its parent's values so $$p(x_1, x_2, \ldots, x_n) = \prod_{i=1}^{n} p(x_i \mid \text{parents}(X_i))$$

where $p(x_1, x_2, \ldots, x_n)$ is an abbreviation for $p(X_1=x_1 \ldots X_n=x_n)$.

29. The system of claim 28, further comprising using a K2 algorithm to determine a sub-optimal structure;
generating a manually structured network and comparing the sub-optimal structure to the manually structured network; and
adding a temporal dimension to the Bayesian network to create a Dynamic Bayesian Network (DBN structure).

30. The system of claim 29, comprising:
replicating the Bayesian network with time-dependent random variables over T time slices, and wherein a new set of arcs defining the transition model is used to determine how various random variables are related between time slices; and
wherein the DBN structure is defined as following:
for each time slice $t_{i,\ i=1, 2, \ldots, 5}$;
each feature $x_i^t$ is the parent of $x_i^{t+1}$;
$C^t$ is the parent of $C^{t+1}$; and
all intra slice dependencies also hold as inter time slices except for arcs from time slice t hidden nodes to time slice t+1 observed nodes.

31. The system of claim 30, comprising:
generating a Hybrid Dynamic Bayesian Network (HDBN), which consists of discrete and continuous nodes, and wherein parameters of the HDBN are required before classification is performed, and wherein the plurality of vehicle classifications include at least one or more of the following: Sedan, Pickup, and SUV or Minivan.

32. The system of claim 24, comprising:
generating a complete system framework, which includes data collection, feature extraction, feature selection, and classification;
extracting features from images of a rear view of a vehicle;
extracting tail light features, wherein the tail light features include separately for each tail light a width, a distance from the license plate, and an angle between the tail light and the license plate; and
extracting license plate features, the license plate features including the license plate location and a size thereof is used as a reference to enable comparison and normalize the tail light features and the vehicle size values.

* * * * *